United States Patent [19]

Schepers et al.

[11] 4,374,119

[45] Feb. 15, 1983

[54] PROCESS FOR THE PRODUCTION OF COARSE CRYSTALLINE ALUMINA

[75] Inventors: Bernhard Schepers, Bergheim, Fed. Rep. of Germany; Volker Nobbe, Neuhausen, Switzerland; Bernd Schröder, Cologne, Fed. Rep. of Germany; Werner Borer, Flurlingen, Switzerland; Manfred Kullack, Bergheim, Fed. Rep. of Germany

[73] Assignee: Swiss Aluminium Ltd., Chippis, Switzerland

[21] Appl. No.: 302,555

[22] Filed: Sep. 16, 1981

[30] Foreign Application Priority Data

Sep. 23, 1980 [CH] Switzerland ..................... 7126/80

[51] Int. Cl.$^3$ ............................... C01F 7/02
[52] U.S. Cl. ........................ 423/625; 423/275
[58] Field of Search ................... 423/111, 275, 625

[56] References Cited

U.S. PATENT DOCUMENTS

| | | | |
|---|---|---|---|
| 2,069,060 | 1/1937 | Fessler | 423/121 |
| 2,833,622 | 5/1958 | Roberts et al. | 423/625 |
| 2,887,361 | 5/1959 | Fenerty | 423/111 |
| 3,262,754 | 7/1966 | Sindsay et al. | 423/625 |
| 3,384,454 | 5/1968 | Barrington | 423/625 |
| 3,950,507 | 4/1976 | Boresker et al. | 423/625 |
| 4,045,234 | 8/1977 | Ring | 423/111 |
| 4,130,402 | 12/1978 | Schepers et al. | 423/625 |
| 4,308,088 | 12/1981 | Cherdron et al. | 423/625 |

FOREIGN PATENT DOCUMENTS

| | | | |
|---|---|---|---|
| 678220 | 1/1964 | Canada | 423/625 |
| 829602 | 3/1968 | United Kingdom | 423/625 |

*Primary Examiner*—Herbert T. Carter
*Attorney, Agent, or Firm*—Bachman and LaPointe

[57] ABSTRACT

The invention describes a process for the production of coarse crystalline alumina from aluminum hydroxide, which after preparation by known methods is advantageously useful for abrasives, lapping and polishing purposes or for refractory materials. The process is characterized by aluminum hydroxide, either directly or after previous partial dehydration in the range 200°–550° C., being added with a mineralizer of compound type $x(BF_4)_n$, wherein x stands for $NH_4$ and metallic elements and n is for the formal valence of x, and subsequently is subjected to an elevated temperature treatment between 750° C. and a value higher than the phase change temperature to $\alpha\text{-}Al_2O_3$.

12 Claims, 1 Drawing Figure

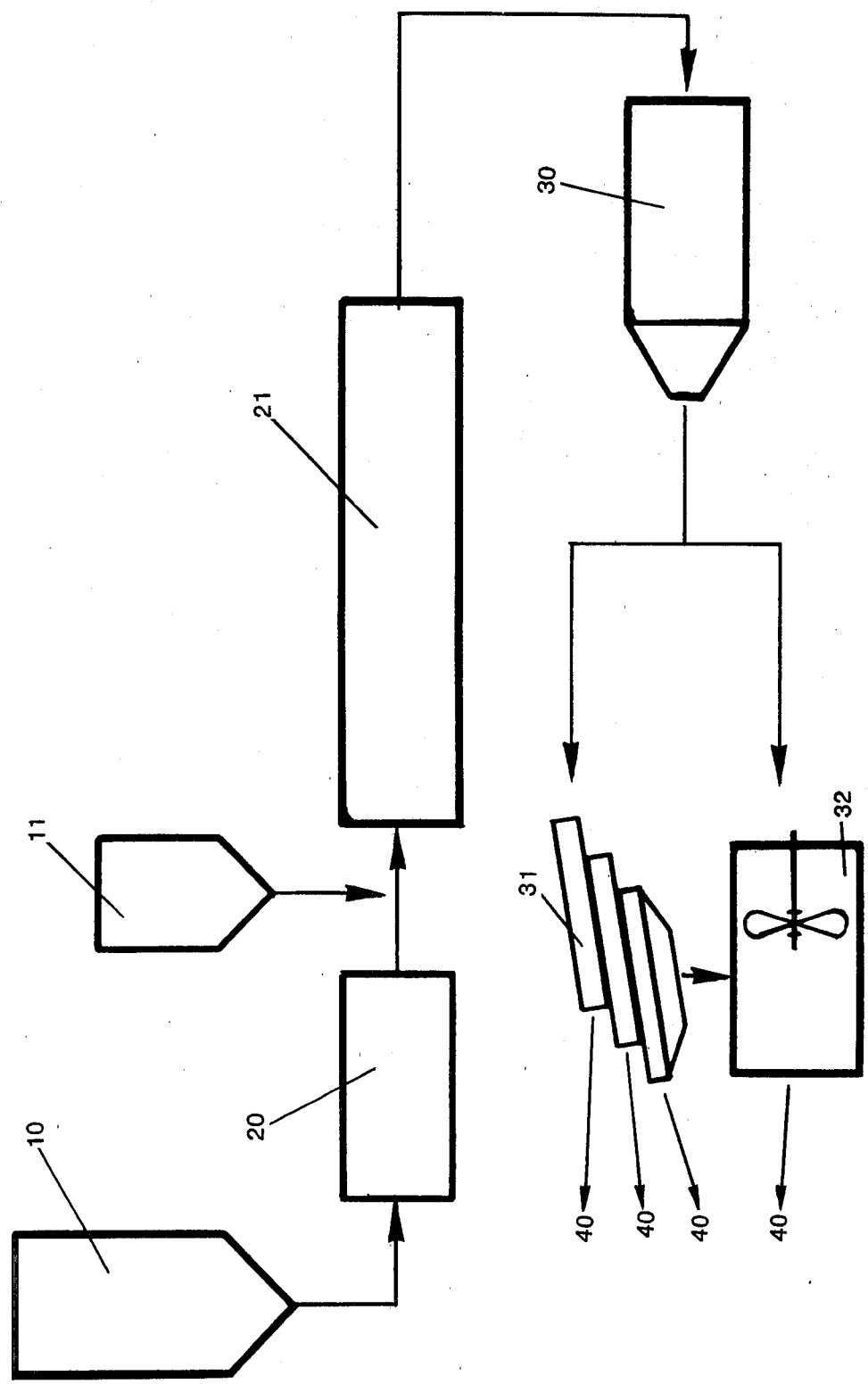

PROCESS FOR THE PRODUCTION OF COARSE CRYSTALLINE ALUMINA

BACKGROUND OF THE INVENTION

The present invention concerns a process for the preparation of coarse crystalline alumina from aluminum hydroxide, which after preparation in a known manner, is used advantageously for abrasives, lapping and polishing and for refractories.

In the abrasives industry, a large demand exists for single crystal corundum particles in the grain size range 800 to 200 according to FEPA corresponding to 10–70$\mu$ average crystallite size.

The possibility has frequently been referred to of preparing the desired single crystal corundum directly from alumina production and thereby bypassing the technically difficult and economically undesirable process of melting and sintering. However, all previous economically justifiable efforts failed to reach an adequate crystal size and/or thin-plated shape.

The present invention overcomes these problems. The alumina produced in accordance with the invention consists of thick plates of corundum single crystals limited by their natural surfaces in the above mentioned particle size range. Also, the alumina produced in accordance with the present invention can be produced cost-effectively.

Alumina is produced on a commercial scale by the well-known Bayer process. After dissolution of the bauxite in sodium hydroxide liquor and subsequent precipitation, aluminum hydroxide is obtained in agglomerate form up to 100$\mu$ size. By calcination in rotating or fluidized-bed ovens, the aluminum hydroxide is converted to alumina. In this way, complete conversion to $\alpha$-alumina is sought which is certainly achieved at temperatures of about 1200° C. and over. An alumina prepared in this way has very small particles, seldom over 5$\mu$ crystal size, and for the above mentioned purpose e.g. polishing, is of little or no value.

It is not for lack of experimentation, especially directed producing abrasives and lapping properties, that alumina products from the Bayer process have not succeeded. It is known that the addition in small quantities of so-called calcination promoters or mineralizers, accelerated and/or decreased the phase change temperature to $\alpha$-alumina. Simultaneously, there is obtained a shift of the crystallite particle size distribution to larger particles.

Effective compounds in this respect are especially the fluorides $NaF$, $CaF_2$, $AlF_3$ and $N_3AlF_6$. DE-AS No. 11 59 418 teaches that a few tenths of a percent of hydrogen fluoride in the oven atmosphere has the same effect.

According to the flow or the heating rate and the kind and quantity of fluoride compounds, the transformation temperature to alumina and associated crystal size can be varied in a limited range.

According to DE-AS No. 28 50 064, the crystallite size is also dependent on the agglomerate size of the aluminum hydroxide. By repeated crystallization using seed crystals consisting of previously calcined product, fluoride containing additives and aluminum hydroxide agglomerates >60 $\mu$, corundum crystals, $\alpha$-$Al_2O_3$ can be prepared with diameter D as the largest dimension perpendicular to the c-axis from 16 to maximum 250$\mu$, with diameter/height ratio D/H between 3 and 7, where the height H refers to the largest dimension parallel to the c-axis.

In processes which do not use seed crystals, only $\alpha$-$Al_2O_3$ crystals with the extremely thin, plate-like hexagonal shapes are obtained. The crystals have in the best case a diameter D of 25$\mu$, the majority of which are about 10$\mu$. The height H in special cases is about a quarter of the diameter and for over 80% of the crystals ranges between one-sixth and one-tenth of the diameter D.

The disadvantage of crystals of this kind for abrasives, lapping and polishing purposes is the too small crystallite size and/or especially in the high diameter to height ratio. Platelike corundum crystals less than a diameter of 10$\mu$ are rarely used by the surface treating industries. Crystals with larger diameters but higher D/H ratios disintegrate very easily during use as an abrasive, especially with lapping and polishing, and then form cutting edges of random geometry. The presumed advantage of single crystal grains with all crystals of equal cutting geometry due to the natural surfaces and the high specific fraction of cutting edges, is at least partly reduced.

For this reason, alumina products from calcination of aluminum hydroxide have not previously made the expected applications in surface treating techniques.

SUMMARY OF THE INVENTION

The purpose of this invention is therefore to prepare a useful single crystal abrasive, lapping and polishing material from calcined alumina. The crystals should have especially a mean diameter of >10$\mu$ and show a correspondingly small D/H ratio.

The object of the invention is therefore 1. to find a suitable mineralizer for the preparation of corundum crystals with the above-mentioned morphology and/or
2. to find a new process using the mineralizers but not requiring the introduction of seed crystals.

The first part of the problem was subsequently solved using as new mineralizers fluoro-boron compounds with the general formula $x(BF_4)_n$, wherein x stands for $NH_4$ and metallic elements, preferably of a valence of 1,2, especially alkaline and alkaline-earths, and n is the corresponding valence of x, in the compound type which functions as the mineralizer of this invention. Univalent cations x have been found to be most preferable, especially ammonium, sodium and potassium.

The second part of the problem is then solved by finding a new process for preparing from aluminum hydroxide coarse crystalline alumina, $\alpha$-$Al_2O_3$, with the above mentioned characteristics, which process is significant by having two stages. In the first stage, the aluminum hydroxide is predried, in the second stage promoted with a substance which functions as mineralizer and treated in a temperature range between 750° C. and a temperature in excess of that required for the phase change to $\alpha$-$Al_2O_3$. Preferably the predrying is carried out in a temperature range $\geq$200°–550° C. Specifically in the first stage, an aluminum hydroxide with an alkali content based on $Al_2O_3$ in the range 0.2–1.4 wt.%, preferably 0.4–0.8 wt.%, is predried at a temperature $\geq$200°–500° C. and effectively dehydrated. Thereafter, in the second stage, the mineralizer is added, particularly of compound type $x(BF_4)_n$ and preferably sodium fluoborate, $NaBF_4$. The material is calcined for about 3 hours in the range 750°–1350° C. A particularly effective additive concentration of 0.1–0.4 wt.% x(BF$_4$)$_n$ has been proven.

BRIEF DESCRIPTION OF THE DRAWING

Further advantages, features and details of the invention are revealed in the following description of the preferred examples together with the attached FIGURE. The drawing shows schematically the procedures of the invention related process and exemplary further treating of the product.

DETAILED DESCRIPTION

The addition of the mineralizer can be made by mixing with the predried material from the first stage or also directly added in the second stage. When adding the mineralizer directly, it can be introduced co-current and/or counter-current i.e. in the case of a rotating oven when the product exits from the first stage and/or by the burner.

Even the application of the invention related mineralizer in the calcination step of aluminum hydroxide, i.e., addition of the mineralizer to aluminum hydroxide without prior dehydration, brings an advantage such that defect-free, morphologically similar $\alpha$-Al$_2$O$_3$ crystals with average diameter of ca. 20$\mu$ with D/H ratio of 2 to 4 and a Na$_2$O-content from $\leqq$0.6 wt.% are produced.

By application of the mineralizer of the invention together with the process of the invention, the crystals grow in an advantageous manner for the desired purpose such that a mean diameter up to 60$\mu$ is apparent with a height of 10–15$\mu$. Sometimes crystals with diameter over 100$\mu$ were observed.

Surprisingly, the formation of the $\beta$-phase of Al$_2$O$_3$, Na$_2$O.11 Al$_2$O$_3$, was not identified even though a high alkali content of up to a maximum 1.4 wt.% based on Al$_2$O$_3$, was used. The calcined final product from the process of the invention and/or the application of the invention related mineralizer, which is able to form the $\beta$-phase, for example NaBF$_4$, resulted practically only in corundum, $\alpha$-Al$_2$O$_3$, when analyzed by x-ray techniques. The $\alpha$-Al$_2$O$_3$ line 002 (CuK$_\alpha$, d=11.3 Å) was only weakly observed in all samples. Further the crystals are clear and homogeneous. The $\alpha$-Al$_2$O$_3$ lines from the x-ray pattern were all sharp indicating defect-free crystals.

In comparative experiments it was shown that aluminum hydroxide, reacted together with sodium, boron and fluoride compounds in stoichiometric proportions equivalent to sodium fluoborate, does not lead to crystal growth as shown in this invention. Rather, there are obtained only crystals with an average diameter of 10 to maximum 20$\mu$ and for abrasives' applications, resulting in insufficient D/H ratios of >8. It was therefore concluded that the stoichiometry for crystal development according to the invention is not determining. Rather, what is important is in which form the mineralizer exists at higher temperatures. An explanation of the advantageous effect of the mineralizer of the invention might be found in that the salts of fluoboric acid of the invention first react at higher temperatures. They are, during the important dehydration phase of the aluminum hydroxide, still not or very weakly dissociated, therefore hardly reacting with the steam produced and also will not be removed from the oven.

The removal of the mineralizer from the calcination process viz. actually out of the rotating oven or fluidized bed oven, is almost completely prevented in the invention related 2-stage process. Simultaneously, the formation of hydrogen fluoride by dissociation of the mineralizer e.g. sodium tetrafluorborate, NaBF$_4$, in the range over about 700° C. is inhibited due to the almost complete absence of larger water vapor quantities, so that the dissociation products of the mineralizer can advantageously affect the crystal growth. Thus, sodium promotes corundum crystal growth through the $\beta$-phase transformation, fluoride causes a reduction in the phase change temperature from $\alpha$-Al$_2$O$_3$ to $\alpha$-Al$_2$O$_3$ and boron subsequently reduces the high alkali content by formation of easily volatile alkali borate compounds.

Referring to the drawing, aluminum hydroxide is in silo 10, the mineralizer in silo 11. The hydroxide is passed through a drier 20 and gives up there most of its water of crystallization. The intermediate product leaving the dryer 20 goes together with the mineralizer into oven 21. The product from oven 21 consists of corundum agglomerates with a crystal morphology of the described art. The agglomerates are by known methods deagglomerated e.g. grinding 30, sieving 31, separated 32, and classified into single crystal fractions.

The dehydration temperature in the drier 20 is relatively unimportant. So this should lie over about 200° C. and if possible not exceed 550° C. since a definite restructuring of the resulting decomposition product is readily obtained. The most preferred range lies approximately between 250° and 500° C. The most preferred residence time of the aluminum hydroxide feed treated at 250° C. is about 3.5 hours and at 500° C. about 1 hour.

The addition of the mineralizer to the intermediate product coming out of the dryer 20 can for example happen in such a way that a decided quantity of mineralizer is added with intensive mixing to a predetermined quantity of intermediate product or continuously by means of a conveyor system which concurrently doses the mineralizer into the oven 21. A loss of quality of the end product was not observed as described in the latter art.

By comparison it is not an advantage to sharply reduce the temperature of the intermediate product or to store it temporarily and allow it to cool to room temperature. In this case cloudy milky crystals often appear in the end product, which to some extent show fine hairline cracks. But these crystals proved to be useful for polishing purposes too, so that this procedure is to be considered in any case within the scope of the invention even though from previous description, it cannot be considered the optimum.

No particular requirements with respect to type or size are necessary for the oven 21. A rotary oven is advantageously used such that in operation the burner head temperature is about 1350° C. and 750° C. is prevalent at the inlet. The length and rotational speed of the oven should be so designed that the material passes through the oven in about 2.5 to 4.5 hours and is in the zone above 1200° C. for about 1 hour. With the direct addition of the mineralizer a thorough mixing with the intermediate product coming out of the dryer 20 occurred in the first meters of the oven traverse; the end-product was always homogeneous.

As already mentioned above, the invention related mineralizer was also effective when the latter was added with the aluminum hydroxide in the dryer 20 and subsequently passed through the calcination oven 21. This process procedure corresponds to conventional processes which utilise a single heated aggregate with the difference that the range in which a significant water vapor atmosphere occurs, is considerably reduced by using a dryer.

Various experiments utilizing aluminum hydroxide and the invention related mineralizer of type $x(BF_4)_n$ led to the preparation of coarse particulate $\alpha$-$Al_2O_3$ (corundum)—crystals which are suitable for abrasives, lapping and polishing purposes and also for use in refractories. Examples with operating parameters and results are summarized in the following table.

| | | | Examples | | | | |
|---|---|---|---|---|---|---|---|
| | | | Mineralizer | | | $\alpha$-$Al_2O_3$ average | |
| Example | Calcination | Mixture of the mineralizer with aluminum hydroxide | Compound | Quality added wt. % | Dryer temperature °C. | crystallite size $\mu$ | $\beta$-phase (reflex D/H 002) |
| 1 | 1-stage | without dryer | $NaBF_4$ | 0,6 | — | 20 | 2-4 weak |
| 2 | 2-stage | before dryer | $NaBF_4$ | 0,6 | 400 | 25 | 2-4 weak |
| 3 | 2-stage | before dryer | $NH_4BF_4$ | 0,6 | 200 | 25 | 2-4 very weak |
| 4 | 2-stage | before dryer | $KBF_4$ | 0,6 | 450 | 30 | 4-6 weak |
| 5 | 2-stage | before dryer | $LiBF_4$ | 0,6 | 200 | 25 | 3-6 weak |
| 6 | 2-stage | before dryer | $Ca(BF_4)_2$ | 0,6 | 200 | 18 | 4-8 weak |
| 7 | 2-stage | before dryer | $NaBF_4$ | 0,05 | 400 | $\leq 15$ | 3-8 indicated |
| 8 | 2-stage | before dryer | $KBF_4$ | 0,05 | 450 | $\leq 15$ | 3-6 indicated |
| 9 | 2-stage | after dryer | $NaBF_4$ | 0,3 | 400 | 35 | 3-6 weak |
| 10 | 2-stage | after dryer | $KBF_4$ | 0,3 | 450 | 35 | 4-6 weak |
| 11 | 2-stage | after dryer | $NaBF_4$ | 0,3 | 400 | 60 | 4-6 very weak |

The dryer temperature was adjusted for each specific mineralizer to avoid possible decomposition. The temperature gradient of the rotary oven was, in contrast, the same for all examples; at the inlet 750° C., at the outlet 1350° C. In all the Examples 1-11, the same aluminum hydroxide, produced according to the Bayer process, was used. It had a mean agglomerate size of $<60\mu$ and contained 0.4 wt.% $Na_2O$ on an $Al_2O_3$ basis.

In Examples 1-10, 300 kg of starting material were taken in each case which for Examples 1-8 were already mixed with the mineralizer and charged at a rate of about 40 kg per hour. In Example 1, the material was placed directly into the rotary oven, in Examples 2-8 the material passed first through the dryer, where the dryer residence time was about 1 hour, in the rotary oven about 2.5 hours. For Example 1, the residence time was about 3 hours. Examples 9 and 10 differ from Examples 2-8 in that the mineraliser was batchwise mixed with the intermediate product coming out of the dryer using an Intensivemixer (type R7, Firma Eirich, Hardheim, BRD). Consequently, the material cooled down to about 120° C. The end product from these experiments contained milky-cloudy crystals.

Example 11 is a commercial scale experiment. The starting material was fed to the drier at about 6.5 tons per hour, the mineralizer was first added continuously after the drier. The time to pass through the drier was about 1 hour, through the rotary oven about 4.5 hours. The oven had a temperature of 750° C. at the inlet, 800° C. in the middle and 1350° C. at the exit.

What is claimed is:

1. Process for the production from aluminum hydroxide of coarse crystalline alumina, $\alpha$-$Al_2O_3$, with a mean crystallite diameter of $>10\mu$, which comprises mixing aluminum hydroxide and a mineralizer of compound type $x(BF_4)_n$, wherein x stands for $NH_4$ and metallic elements with a valence of 1 or 2, and n for the formal valence level of x, and subjecting said mixture to an elevated temperature treatment between 750° C. and a value lying above that required for the phase change to $\alpha$-$Al_2O_3$ to convert said aluminum hydroxide to the $\alpha$-$Al_2O_3$.

2. Process for the production of coarse crystalline alumina according to claim 1 wherein the maximum temperature is about 1350° C. and the residence time between 750° and 1350° C. is about 2.5-4.5 hours.

3. Process according to claim 1 wherein x is sodium.

4. Process according to claim 1 wherein x is potassium.

5. Process for the production of coarse crystalline alumina according to claim 1 wherein from 0.1 to 0.4 weight percent of the mineralizer is added.

6. Process for the production of coarse crystalline alumina according to claim 1 wherein aluminum hydroxide is used with an agglomerate size of $<60\mu$ and a $Na_2O$ content based on $Al_2O_3$ of preferably 0.4-0.8 weight percent.

7. Process according to claim 1 which comprises a two-stage process wherein in the first stage the aluminum hydroxide is predried.

8. Process for the production of coarse crystalline alumina according to claim 7 wherein the first process stage is conducted at a temperature range from $\geq 200°$-550° C.

9. Process for the production of coarse crystalline alumina according to claim 7 wherein the first process stage is conducted at a temperature range from $\geq 400°$-550° C.

10. Process according to claim 7 wherein the aluminum hydroxide is substantially dehydrated in the predrying step.

11. Process according to claim 7 wherein the aluminum hydroxide starting material has an alkali content based on $Al_2O_3$ in the range 0.2-1.4%.

12. Process for the production of coarse crystalline alumina according to claim 7 wherein the maximum temperature in the second stage is about 1350° C. and the residence time about 2.5-4.5 hours, of which for about 1 hour 1200° C. is exceeded.

* * * * *